UNITED STATES PATENT OFFICE 2,576,371

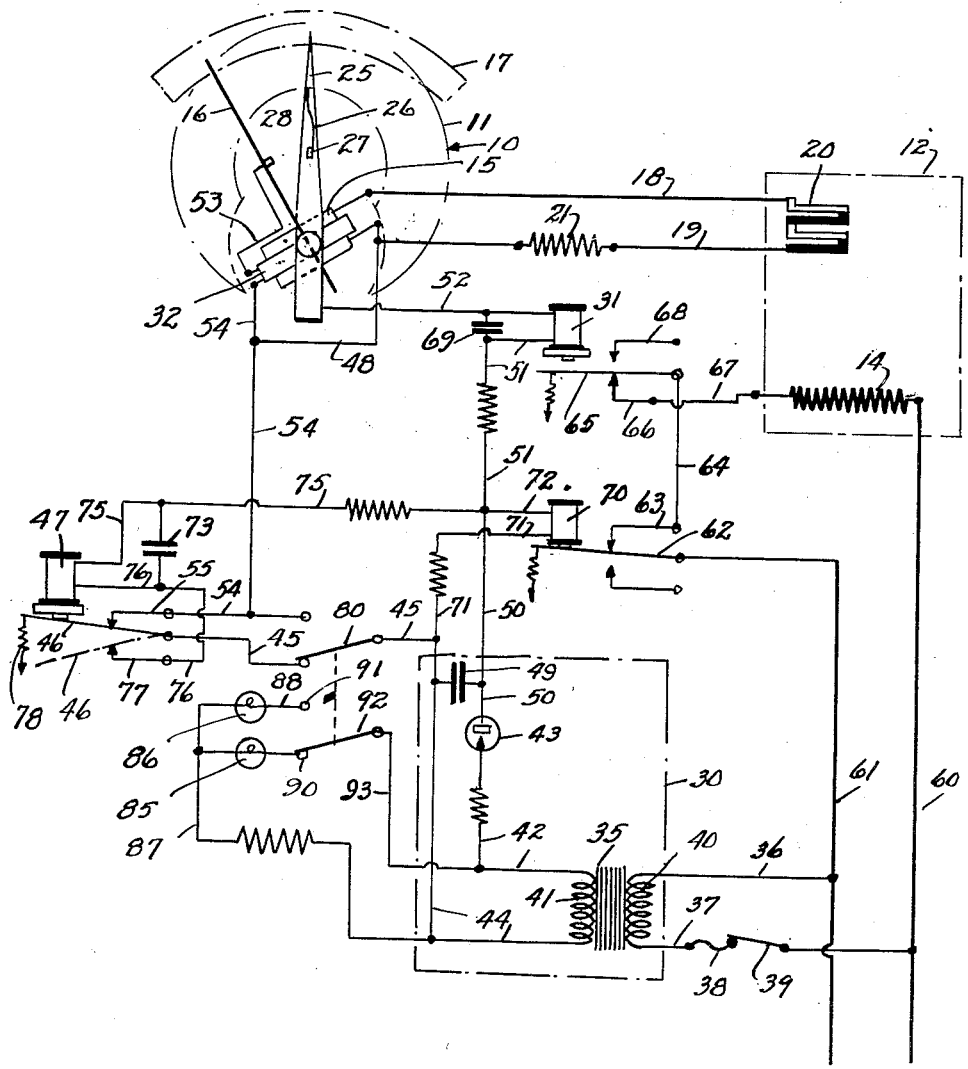

ELECTRICALLY OPERATED CONTROL DEVICE

Bradley R. Thompson, South Euclid, and George E. Hammond, Euclid, Ohio, assignors to Simplytrol Products Company, Chagrin Falls, Ohio, a corporation of Ohio Application October 16, 1948, Serial No. 54,964

3 Claims. (Cl. 236—69)

This invention relates to an improved electrical control system, and more specifically to an improved mechanism and system to be used as a control and indicator for industrial operations and the like and which will be responsive to energy changes in the operation to be controlled, as for example, changes in temperatures, light intensity, electrical overloads and underloads, speeds of movement and the like. These, therefore, are the general objects of the present invention.

A more specific object of the present invention is to provide an improved temperature indicator and control device for use in connection with ovens, furnaces, baths, cold chambers and the like, which device will be highly and quickly responsive to relatively minor changes in temperature to thereby facilitate its use in industrial installations where extreme accuracy is required.

Other objects and advantages of the invention will become more apparent from the following description, reference being made to an embodiment of the invention illustrated in the accompanying drawing. The essential features of the invention will be summarized in the claims.

In the accompanying drawing, the single figure is a diagrammatic illustration of the improved electrical control and indicating system as incorporated in a heating installation such as an industrial electrically heated furnace or oven.

In general the improved system device includes a moving coil, permanent magnet type of electrical indicator 10, such as a micro-ammeter connected to respond to changes in the operation to be controlled, as for instance, to changes in temperature in a furnace 12. In the embodiment illustrated, the indicator or meter 10 breaks an electrical circuit as the temperature of the furnace or oven reaches the desired temperature, such circuit being connected to control the source of heat for the furnace.

The electrical indicating instrument 10, as indicated, comprises a moving coil permanent magnet type, direct current electrical meter, such as a D'Arsonval type micro-ammeter. In such an instrument, a relatively small coil, with steel pivots and turning in jeweled bearings, is mounted in a magnetic field produced by permanent magnets. The turning motion of the coil is restrained by flat coiled springs which also serve to conduct current to the coil. The deflections of the coil are read with a light aluminum pointer fixed to the coil and moving over a graduated scale. In the drawings the permanent magnet is indicated at 11; the coil at 15; the pointer at 16; and the scale at 17. The other parts of the instrument are well known and accordingly are not illustrated in detail in the accompanying drawings.

In the embodiment illustrated the meter coil is connected by electrical conductors 18 and 19 with a thermo-couple 20 which is positioned within the oven or furnace 12, the temperature of which is to be controlled. For low and moderate ranges of temperature, iron-constantan or copper-constantan thermo-couples are used. Other types of thermo-couples may be used for specific applications, for instance a chrome-alumel thermo-couple may be used for temperatures up to twenty-five hundred degrees Fahrenheit. A resistor 21 is placed in the conductor 19 to compensate for the length of the conductors and maintain a predetermined resistance in the circuit, thus providing for dampening of the movement of the needle at all times. The instrument is thus responsive to minor fluctuations in temperature in the oven. The scale 17 is preferably graduated and marked so that the position of the pointer 16 visibly indicates the temperature of the furnace or oven 12.

The instrument of the present invention is provided with a second pointer 25. This pointer is mounted for swinging movement about the axis of the coil 15, but is carried by a fixed or relatively stationary member of the instrument. The pointer 25 is normally held stationary, as by frictional engagement with stationary parts of the meter, but may be manually moved, with reference to the pointer 16 and the scale 10, to a position to indicate the desired temperature. The pointer 25 carries a light leaf spring 26 provided with a contact member 27, and the pointer 16 carries a coacting contact 28. The arrangement is such that when the oven 12 reaches the desired temperature the contact 28 of the movable pointer 16 will engage the contact 27 of the stationary pointer 25 and will break such engagement when the temperature falls below that desired.

When the contacts 27 and 28 move together under an electrical impulse provided by the thermo-couple 20, a circuit is established from a supplemental source of power 30 to a relay 31 and a supplemental coil 32 carried by the instrument coil 15. The relay 31 controls the application of power to the heating unit 14 of the furnace and the coil 32 increases the pressure between the contacts 27 and 28 and locks them together.

The supplemental source of power comprises, as shown, an isolating transformer 35, the primary winding 40 of which is connected with a source of alternating current by conductors 36 and 37. One of the conductors, as for instance that shown at 37, is provided with a fuse 38 and a controlling switch 39. One terminal of the secondary winding 41 of the transformer 35 is connected by a conductor 42, with a rectifier element 43. A selenium type rectifier may be used for this purpose. The other terminal of the secondary winding 41 is connected by conductors 44 and 45 with the movable contact 46 of a single pole, two position relay 47. A condenser 49 may be connected between the rectifier outlet line 50 and the conductor 44 to secure a more even sourc of electrical energy.

The output, or positive side of the rectifier 43, is connected by conductors 50 and 51 with one terminal of the operating coil of the relay 31. The other terminal of this relay operating coil is connected by a conductor 52 with the supplemental pointer 25 and through the pointer, which is insulated from the instrument 10, and the spring 25 to the spring carried contact 27. The contact 28 of the movable or indicating pointer 16 is connected by a conductor 53 with one terminal of the supplemental coil 32 of the meter 10. The other terminal of this coil is connected by a line 54 with stationary contact 55 of the relay 47 which, when in the position shown in the drawing, completes the circuit above described. The energization of the supplemental coil 32 thus increases the pressure between the contacts 27 and 28 and locks them closed. The lines 54 and 19 may be joined in the meter assembly by a line 48 to reduce the number of lines leading from the meter. Concurrent with the energization of the coil 32, relay 31 is energized. This relay is in series with the supplemental coil 32, and opens a normally closed power circuit to the heating element 14.

The power lines are illustrated at 60 and 61. The line 60 is connected directly with the heating element 14. The line 61 is connected with the movable contact 62 of a relay 70, which when energized, establishes a circuit between such contact and a stationary relay contact 63. The latter contact is connected by a conductor 64 with the movable contact 65 of the relay 31. The normally closed, stationary contact 66 of this relay is connected by a line 67 with the heating element 14. Consequent upon energization of the relay 31, due to coaction of the instrument contacts 27 and 28, the relay 31 is opened, thus opening the circuit to the heating element 14.

The control device is illustrated in use to control a heating element which is normally active. However, it is sometimes desirable to use the device in connection with other types of installations. For instance, an electrically operated cooling device may be substituted for the heating element 14. Under the latter condition it would be desirable that the cooling device operate on a rise in temperature. Accordingly, the line 67 would be removed from the relay contact 66 and connected with the relay contact 68. This would result in a normally open cooling circuit which would be closed consequent upon the operation of the relay 31.

To insure locking of the contacts 27 and 28 prior to the opening of the power circuit to the heating element 14, the relay 31 is a retarded action relay. This retarding action may be accomplished by placing a capacitor 69 across the operating coil of the relay 31. A condenser having a capacity of about 200 mf. will accomplish the desired result.

The relay 70 is used to prevent operation of the heating unit 14 unless the control device is in operation. This relay is an instantaneous acting normally open relay, and its operating coil is connected by lines 71 and 72 with the output lines 50 and 44 of respectivity of the supplemental power unit 30.

The relay 47 acts to alternately interrupt and energize the locking circuit to the instrument coil 32. When this locking circuit is interrupted, the circuit controlling the operating relay 31 is responsive to the thermo-couple circuit. However, when the locking circuit is energized, this relay circuit is maintained active by the locking circuit. The frequency of this interruption is controlled by the retarding action of the relay 47, as for instance, by a capacitor such as the condenser 73. The retarded action of the relay 31 eliminates chattering when the locking circuit is interrupted, particularly when the temperature of the furnace is at its critical point, namely exceedingly close to the temperature for which the stationary needle is set.

The relay 47 is a single pole double contact relay. One terminal of the operating coil of this relay is connected by a line 75 with the supplemental power output line 50, and the other terminal is connected by a line 76 with the normally closed contact 77 of this relay. The normally open contact 55 of this relay is connected to the supplemental coil 32, and the movable contact 46 is connected with the supplemental power line 44, as heretofore described. A capacitor 73 is placed across the lines 75 and 76.

In the normal position of the relay 47 the contacts 46 and 77 thereof complete the circuit between the operating coil of the relay and the supplemental source of power, and the contacts 46 and 55 open the circuit between the supplemental source of power and the meter locking coil 32. When the power switch 39 is closed the circuit to the relay 47 is established, and after a predetermined interval of time, controlled by the capacitor 73, the relay operates to move the movable contact to the full line position shown in Fig. 1, opening the relay operating circuit and establishing the meter locking circuit. The retardation of the action of the relay by the capacitor 73 holds the relay in this position for a brief interval of time after the relay operating circuit is broken, following which the return spring moves the contact 46 to its dotted line position. It has been found satisfactory to use a condenser having a capacity of about 200 mf., for this purpose. Accordingly, the relay acts as a vibrator and alternately opens and closes the meter locking circuit, holding such circuit open and closed for a predetermined period of time.

A manually operable switch is provided to connect the meter locking circuit directly with the supplemental source of power. Such a switch is shown at 80 as being interposed in the line 45 which connects the movable contact of the relay with the supplemental power line 44. When this switch is moved to its upper position shown in Fig. 1, it connects the supplemental power line direct with the line 54 which leads to the locking coil 32 of the meter. Under such conditions the interrupting relay 47 remains idle, and once the meter contacts 27 and 28 are closed, the locking circuit remains effective until manually released.

In operation of the embodiment of my invention wherein the manually operable switch 80 is in the full line position shown in Fig. 1, closing of the controlling switch 39 applies power to the supplemental source 40 which, in turn, energizes the relays 70 and 47. Energization of the relay 70 acts to pick up the movable contacts to thereby apply the input power source from lines 61 and 60 to the heating element 14 through the normally closed contact 66 of relay 31. The retarded relay 47 subsequently acts to pick up the movable contact 46 which, but for the open circuit at the contact members 27 and 28, would act to establish a circuit through the relay coil 31 and locking coil 32. However, the circuit to the contact members 27 and 28 is not established until such time as the temperature in the furnace has reached the maximum temperature set by the adjustable pointer 25, at which time the voltage developed across the movable coil 15 is translated into a turning torque sufficient to move the movable pointer 16 into juxtaposition with the adjustable pointer 25 thereby closing the contacts 27 and 28. Before this maximum temperature is reached however, the picking up of the movable contact arm 46 by energization of the relay 47 acts to remove the energizing voltage from the relay 47, and, after a predetermined length of time, depending on the time constant of the relay circuit, the relay 47 becomes de-energized and the movable contact 46 drops back into its normal position on fixed contact 77 to again establish energizing voltage to the relay.

The operation of the relay 47 is cyclic, as described, so long as the controlling switch 39 is closed and the manually operable switch 80 is in the full line position shown. Once the maximum temperature has been reached, however, the contact members 27 and 28 are closed, and when the relay 47 is energized, it establishes the circuit through the locking coil 32 and relay coil 31. The energization of the relay 31 acts to pick up the movable contact 65, thus removing the application of power to the heating element 14. The fact that the relay 31 is also a retarded action relay depending on the time constant of that relay circuit insures that the supplemental torque created by the energization of the supplemental coil 32 will lock the contact members 27 and 28 before the circuit to the heating element is open.

In the meantime, the relay 47 continues its cyclic operation, and in effect, periodically reestablishes and breaks the circuit to the movable contact members 27 and 28 and the relay coil 31. This periodic interruption of the circuit through the relay coil 31 being of a somewhat greater frequency than the delayed or retarded action of the relay 31 does not affect the operation of the relay 31 so long as the maximum temperature is maintained in the oven and the movable contact members 27 and 28 remain closed. Thus, the power remains off of the heating element 14 until such time as the temperature is sufficiently reduced in the furnace to reduce the voltage applied to the moving coil 15, thereby resulting in an opening of the contacts 27 and 28 and consequent opening of the circuit through the relay 31 to reestablish power to the heating element 14. An advantage of this arrangement lies in the fact that the relay 47, which establishes the meter locking and control circuit through relay 31, acts in a cyclic manner to periodically reestablish this circuit and to automatically periodically check the condition of the temperature in the furnace with attendant control of the heating element therein.

A visible indicator is provided to indicate whether the interruptor relay is active or not. As illustrated, a pair of signal lamps 85 and 86 are provided. Each lamp has one terminal connected by a line 87 with the supplemental power line 44. The other terminals of these lamps are connected by lines 88 with respective switch contacts 90 and 91. A switch member 92 moves between the contacts 90 and 91 in response to the movement of the switch 80, heretofore described. The switch 92 is connected by a line 93 with the supplemental power line 42. Thus the lamp 88 will indicate that the locking circiut is automatically broken, and the lamp 89, that the locking circuit must be broken manually by operation of the switch 80.

It will be noted that the locking coil is energized consequent upon the meeting of the meter contacts 27 and 28. This gives additional turning torque to the needle 16 compressing the spring 26. When the locking circuit is broken this torque is removed and the spring 26 forces the moving needle back farther than its point of contact. This assures a clean break and prevents sticking or arcing of the contacts. The delayed action of the relays prevents disruption of the circuits during the period of break, unless the break is maintained by the thermo-couple.

One of the advantages of this invention is the fact that an extremely accurate control may be obtained for almost immeasurable changes in current in the indicating coil. For instance: Let us assume that the contacts are set to close when there is 0.000125 ampere in the meter indicating coil 15, and that with this current in the indicating coil, 0.250 second elapses from the time the circuit of the contact or locking coil 32 is broken until the contacts come back together. Then with 0.000126 ampere in the indicating coil it may require 0.200 second, and, with 0.000124 ampere current it will require infinite time for the contacts to close. With the high damping which is inherent in the moving element the time increases very rapidly as the current in the indicating coil is decreased.

By using a control in the locking or contact coil circuit that is set to operate at, say, 0.225 second after the contacts 27 and 28 open, very fine control is obtained. It is conceivable that a change of as little as one fiftieth of 0.000001 ampere would be sufficient to operate the control system. If a meter is used which requires 150 microamperes for a full scale deflection of the indicating needle, and the scale is provided with 150 divisions then each division represents 0.000001 ampere. With such a meter the control system will respond to a change of current in the indicating coil corresponding to only one fiftieth of one division or one seventy five hundredth of the total scale length. This is far less than the change required to overcome the friction of the moving element in ordinary systems.

We claim:

1. In an electric control system for controlling temperature in ovens and the like, a thermo-couple responsive to the temperatures to be controlled, an ammeter having a moving coil, connections between said coil and said thermo-couple whereby said coil is energized and moved in response to changes in temperature in the region of the thermo-couple, a source of power, a heating element connected with said source of power, means including an electrically operated relay connected to disconnect said source of power from said heating element, a supplemental source of electric energy, an indicator secured to said moving coil, a relatively fixed indicator, contacts carried by respective indicators, and a circuit between said source of energy and said relay including said contacts, whereby the meeting of said contacts energizes said relay and disconnects the heating element from its source of power, a second coil movable with the first named coil, a circuit between said source of power and said second coil including said contacts whereby the meeting of said contacts energizes said second coil and applies a contact closing torque to said movable indicator, an electric relay interposed in the circuit to the second coil, connections between said relay and said source of energy, said relay including means to break said last named connection when the relay becomes energized and to establish the circuit to the second named coil, means to return the relay, and means to retard the opening and closing movements of said relay.

2. In a control system according to claim 1, means to retard the action of said first named relay.

3. In a control device according to claim 2, a third normally open relay connected between said source of power and said first named relay and adapted when energized to establish a connection therebetween, operating connections between said source of energy and said third relay, a manually operable switch to control the output of said source of energy whereby said control device must be rendered active before power will be applied to said heating element.

BRADLEY R. THOMPSON.
GEORGE E. HAMMOND.

REFERENCES CITED

The following references are of record in the file of this patent:

UNITED STATES PATENTS

| Number | Name | Date |
|---|---|---|
| 1,728,802 | Newhill | Sept. 17, 1929 |
| 2,212,760 | Uehling | Aug. 27, 1940 |
| 2,256,304 | Wills | Sept. 16, 1941 |
| 2,272,914 | Keeler | Feb. 10, 1942 |